United States Patent
Saluja et al.

(10) Patent No.: US 11,770,318 B2
(45) Date of Patent: Sep. 26, 2023

(54) SYSTEMS AND METHODS FOR ESTIMATING THROUGHPUT

(71) Applicant: T-Mobile USA, Inc., Bellevue, WA (US)

(72) Inventors: Aditi Saluja, Bellevue, WA (US); Ruchir Sinha, Newcastle, WA (US); Scott Toborg, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/201,775

(22) Filed: Mar. 15, 2021

(65) Prior Publication Data

US 2022/0294718 A1    Sep. 15, 2022

(51) Int. Cl.
| | |
|---|---|
| H04L 43/0888 | (2022.01) |
| H04L 47/24 | (2022.01) |
| H04L 61/4511 | (2022.01) |
| H04L 43/16 | (2022.01) |
| H04L 43/0817 | (2022.01) |
| H04L 67/61 | (2022.01) |

(52) U.S. Cl.
CPC ...... *H04L 43/0888* (2013.01); *H04L 43/0817* (2013.01); *H04L 43/16* (2013.01); *H04L 47/24* (2013.01); *H04L 61/4511* (2022.05); *H04L 67/61* (2022.05)

(58) Field of Classification Search
CPC ..... H04L 43/0817; H04L 47/24; H04L 67/61; H04L 43/0888

USPC ........................................................ 709/224
See application file for complete search history.

(56) References Cited

U.S. PATENT DOCUMENTS

| | | | |
|---|---|---|---|
| 2007/0043871 A1* | 2/2007 | Sweedler | H04L 69/22 709/227 |
| 2008/0165964 A1* | 7/2008 | Lewis | H04L 63/0227 380/255 |
| 2009/0279701 A1* | 11/2009 | Moisand | H04L 12/1886 380/278 |
| 2012/0287784 A1* | 11/2012 | Shatzkamer | H04W 28/26 370/230.1 |
| 2013/0007263 A1* | 1/2013 | Soroushian | H04N 21/2393 709/224 |
| 2017/0085622 A1* | 3/2017 | Gopinath | H04L 67/1001 |
| 2020/0288212 A1* | 9/2020 | Alvarez Dominguez | H04L 45/22 |
| 2021/0120048 A1* | 4/2021 | Gu | H04M 7/006 |

* cited by examiner

*Primary Examiner* — Meng Vang
(74) *Attorney, Agent, or Firm* — Lee & Hayes, P.C.

(57) ABSTRACT

Systems and methods for predicting throughput in a network are described herein. The systems and methods use, in some examples, impaired DNS lookup times to predict what a throughput measurement would have been at the time of the issue had a measurement been taken. Using impaired DNS lookup times rather than constantly measuring throughput can reduce the workload of the cellular network while also reducing the storage capacity needed to measure throughput values for all of the devices using the cellular network. Throughput prediction may be used in other ways, including, but not limited to, device testing and assessment.

12 Claims, 4 Drawing Sheets

SYSTEMS AND METHODS FOR ESTIMATING THROUGHPUT

BACKGROUND

When determining issues in a network, data about the performance of various devices is often used to assist in determining if there is a problem. This data is used in a subsequent troubleshooting effort should a problem be identified. However, throughput issues are often difficult to detect because the sheer number of mobile devices using a network often preclude the ability to continually measure throughput for every device using the network. The amount of data storage required to measure and store data for even a small percentage of users of a network would be prohibitively expensive and would significantly tax network computing resources.

Thus, when presented with possible issues of throughput, networks are often left with trying to use current conditions to make guesses about past performance. However, even if a troubleshooting operation is commenced shortly after a throughput issue is noticed, conditions that caused throughput issues in the past may not be present at the time of troubleshooting. In some examples, a network may try to install an application on a mobile unit. The application may be a constantly-running application that measures throughput. Thus, when a throughput issue occurs, the network may access the application. However, this can be taxing on the mobile unit itself, reducing battery life by increasing onboard central processor and memory usage. Further, it may be relatively expensive to deploy, manage, and maintain device applications. Preloaded applications can be extremely difficult to prioritize and often must compete with other applications that are considered more important for the customer experience.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Figure 1:
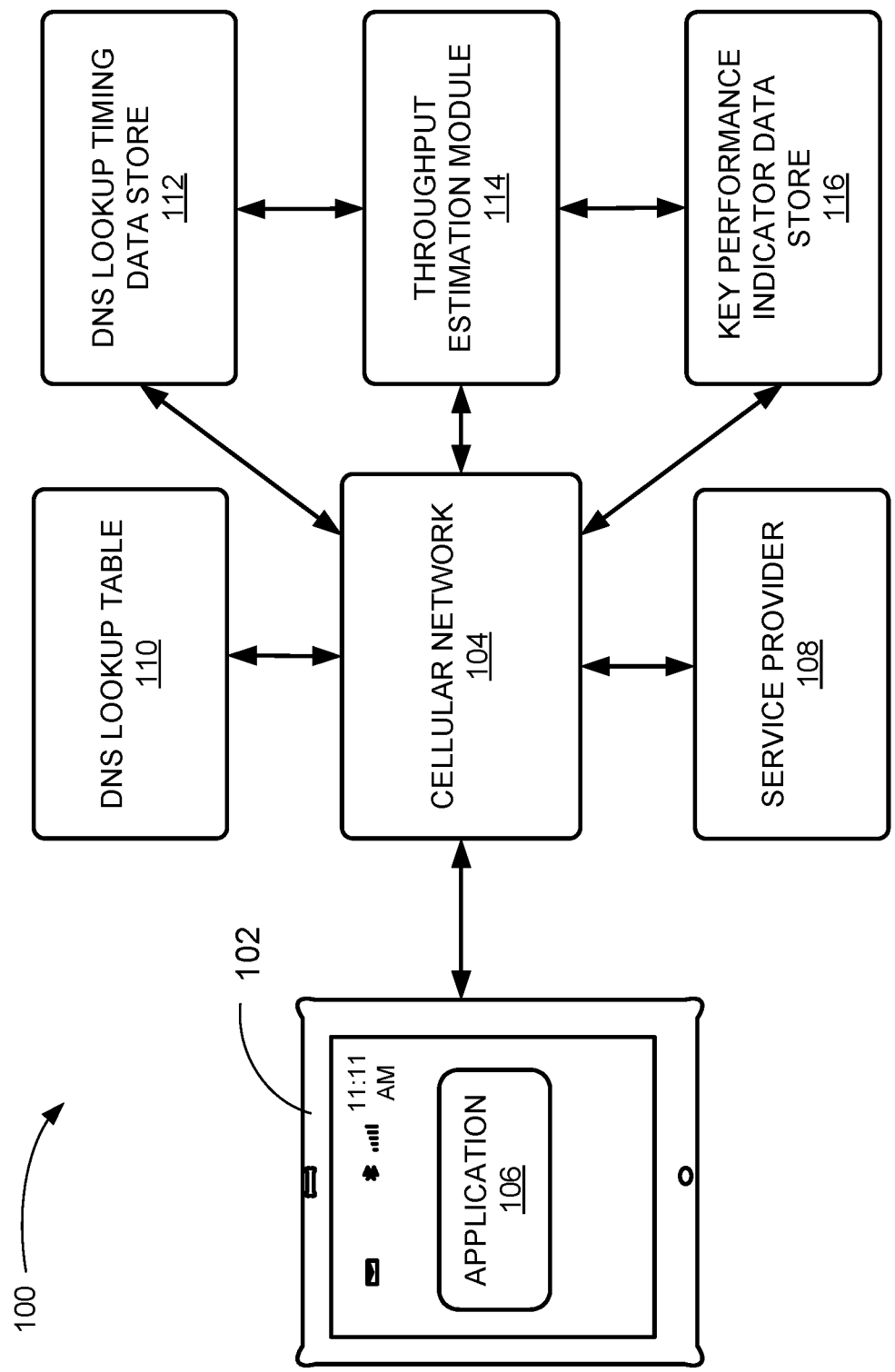
FIG. 1 illustrates an example environment for troubleshooting throughput, in accordance with some examples of the present disclosure.

Examples of the present disclosure can comprise systems and methods for troubleshooting throughput. In some examples, a prediction algorithm uses one or more indicators, sometimes referred to herein as key performance indicators (KPIs), or network and device attributes, that predict what the throughput measurement of a mobile device or other user device would have been had it been measured at the time of the potential throughput issue. In an example, the presently disclosed subject matter can use a measured Domain Name System (DNS) impairment to predict what the measured throughput value would have been at the time of the reported or identified issue. The DNS impairment data uses DNS lookup times as a main prediction value for specific device performance. Other examples of the presently disclosed subject matter may use other or additional network and device attributes to increase the accuracy of the prediction. When used together with throughput examples in a predictive algorithm we can use those attributes, as well as other factors, to extrapolate estimates for other devices.

Various examples of the presently disclosed subject matter may help increase network efficiency and/or reduce system loads. For example, as mentioned above, measuring and storing throughput of each device utilizing a network can both tax network resources and require a significant increase in storage capacity, especially if a network is heavily utilized with a significant number of devices. An alternative mentioned above may be for the devices themselves to measure throughput. However, in order to provide a meaningful measurement, the device would need to measure continuously or periodically during use. A continuous measurement will likely decrease the battery life and times between charging due to the constant processing required to detect and store the measurement on the device.

Rather than requiring a constant throughput measurement and storage, one or more performance indicators that are detected during normal use may be identified and stored. In one example, a performance indicator may be DNS timing. DNS timing is a measurement of time taken by a network to perform a Domain Name Service lookup. In some examples, although DNS timing may be a general indicator of throughput, other performance indicators may be used to further define a throughput issue. In some examples, DNS timing and impairment may not be sufficient. In some examples, a problem with DNS impairment alone is may be a significant number of outside factors affecting impairment, such as, but not limited to, network congestion and DNS server congestion outside the device network. Thus, instead of requiring a network to instantiate a new module for measuring throughput, which in and of itself will likely tax network resources, the presently disclosed subject matter uses a performance metric already determined by a network, such as DNS timing and other metrics, and uses those metrics as the basis for determining (predicting) what the throughput would have been at the time an issue was detected or reported.

FIG. 1 illustrates an example environment 100 for troubleshooting throughput, in accordance with some examples of the present disclosure. The environment 100 includes a user equipment ("UE") 102 that can receive and transmit information to a cellular network 104. Examples of the UE 102 can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of the user equipment 102 include, but are not limited to, smart devices such as televisions, refrigerators, washing machines, dryers, smart mirrors, coffee machines, lights, lamps, temperature sensors, leak sensors, water sensors, electricity meters, parking sensors, music players, headphones, or any other electronic appliances that can generate, request, receive, transmit, or exchange voice, video, and/or digital data over a network, such as the cellular network 104 or another network.

In general, the cellular network 104 can be implemented as a variety of technologies to provide wired and/or wireless access to a network, as discussed herein. In some instances, the cellular network 104 can include a 3GPP Radio Access Network ("RAN"), such a GSM/EDGE RAN (GERAN), a Universal Terrestrial RAN (UTRAN), a New Radio (for 5G), or an evolved UTRAN (E-UTRAN), or alternatively, a "non-3GPP" RAN, such as a Wi-Fi RAN, or another type of wireless local area network (WLAN) that is based on the IEEE 802.11 standards. Further, the cellular network 104 can include any number and type of transceivers and/or base stations representing any number and type of macrocells, microcells, picocells, or femtocells, for example, with any type or amount of overlapping coverage or mutually exclusive coverage.

It should be understood that various additional modules associated with cellular networks or other RANs are not illustrated herein merely for purposes of description and not to limit the application of the examples described herein to cellular networks or RANs without those modules. For example, in some instances, the environment 100 can further include one or more communication servers to facilitate communications by and between the various devices in the environment 100. That is, environment 100 can include any computing devices implementing various aspects of one or more of second, third, fourth, and fifth generation (2G, 3G, 4G, 5G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; Long Term Evolution (LTE), including LTE Advanced, and Evolved High-Speed Packet Access (HSPA+) are examples of 4G telecommunications technologies; and New Radio (NR) is an example of 5G communication technologies. Thus, the environment 100 may implement GSM, UMTS, LTE/LTE Advanced, and/or NR telecommunications technologies.

The environment 100 may include, but is not limited to, a combination of: base transceiver stations BTSs (e.g., NodeBs, Enhanced-NodeBs, gNodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), or any other data traffic control entity configured to communicate and/or route data packets between the user equipment 102, the cellular network 104, and any endpoints. While FIG. 1 illustrates the environment 100, it is understood in the context of this document, that the techniques discussed herein may also be implemented in other networking technologies, such as nodes that are part of a wide area network (WAN), metropolitan area network (MAN), local area network (LAN), neighborhood area network (NAN), personal area network (PAN), or the like.

UE 102 includes an application 106 that is executed by the UE 102. The application 106 utilizes the connection between the UE 102 and the network 104 to access the services of a service provider 108. The service provider 108 may be one of a number of websites or services provided on the Internet. In order to utilize the services of the service provider 108, the application 106 transmits to the cellular network 104 a domain name of the service provider 108. The cellular network 104 receives the domain name and accesses a DNS lookup table 110. The DNS lookup table 110 contains the Internet Protocol (IP) addresses of the domain name requested by the application 106. The cellular network 104 retrieves the IP address and transmits it to the application 106 so that the application 106 can locate and use the services of the service provider 108 on the Internet.

In the presently disclosed subject matter, the timing of the DNS lookup process described above is stored as a performance metric in the DNS lookup timing data store 112. The timing may be measured and stored as the time taken from the receipt of a DNS lookup request from the application 106 to the time the cellular network 104 transmits the IP address of the requested domain. Other timings may be measured and stored, the variations of which are considered to be within the scope of the presently disclosed subject matter. In some examples, the timing may be determined from the receipt at the cellular network 104 for a DNS lookup from the application 106 and a timestamp received from the application 106 indicating the time at which the DNS lookup request was transmitted by the application 106. In other examples, the timing may be determined from the time the cellular network 104 transmitted a request to the DNS lookup table 110 and the time the cellular network 104 transmitted a received IP address to the UE 102.

A throughput estimation module 114 receives the timings from the DNS lookup timing data store 112 and determines if the timing represents an impaired DNS lookup. In some examples, an impaired DNS lookup means that the time measured for a particular timing is greater than a predetermined or maximum time. Thus, a DNS lookup that exceeds that time, or one that fails and does not result in the transmission of an IP address to the UE 102, may constitute an impaired DNS lookup. In some examples, the throughput estimation module 114 performs a count of the number of impaired DNS lookups for the UE 102 over a specified time period, e.g. an hour. The throughput estimation module 114 provides the number of impaired DNS lookups to the DNS lookup timing data store 112 for storage. The throughput estimation module 114 may perform this operation for each user equipment utilizing the network 104 and requesting DNS lookups, not just the UE 102. In some examples, the DNS lookup timing data store 112 may only maintain data of DNS lookup timings for a period of time required by the throughput estimation module 114 to perform the impaired DNS lookup determination.

Once the impaired DNS lookup is determined and stored in the DNS lookup timing data store 112, the timings of the particular DNS lookups may be erased or allowed to be overwritten by other timings. This may help reduce the storage necessary to perform the presently disclosed subject matter, especially across an entire network. However, in other examples, the DNS lookup timings for the UE 102 and other UEs may be persisted in memory. The presently disclosed subject matter is not limited to any particular storage process. It should also be understood that the determination of impaired DNS lookup counts made is not limited to any particular time. For example, the determination may be made at the time of the receipt of a notification that a potential throughput issue occurred rather than on an ongoing basis. The presently disclosed subject matter is not limited to any particular timing for performing a calculation of impaired DNS lookup count for a particular UE.

In the present example of FIG. 1, when the cellular network 104 receives an indication of a potential throughput issue of the UE 102 for a past communication over the cellular network 104, the cellular network 104 accesses a throughput estimation module 114 to retrieve the impaired DNS lookup counts for the time period in which the potential issue occurred. As noted above, the impaired DNS counts may have been previously calculated by the throughput estimation module 114, or may be calculated at other times, such as when the indication or notice is received. In some examples, the notification may be received from the UE 102, or a user of the UE 102, requesting a troubleshooting operation for a perceived throughput issue when using the UE 102. In other examples, the notification may be received from other processes. For example, the throughput estimation module 114 may generate the notification to the cellular network if the impaired DNS counts for one or more UEs exceeds a certain number. This may provide the cellular network 104 with an early indication that there may be issues on the network.

Once the impaired DNS counts are retrieved from the throughput estimation module 114, the cellular network 104 can then commence a troubleshooting operation. The cellular network 104 receives the impaired DNS counts and determines if the impaired DNS counts at the time of the potential issue actually constitute an issue. The cellular network 104, upon determining that an issue occurred, may query one or more functions of the cellular network 104 to determine a source of the potential issue to correct the potential issue. Thus, the cellular network 104 uses the impaired DNS counts determined by the throughput estimation module 114 using data provided by the DNS lookup timing data store 112 to find and fix potential throughput issues. Thus, in these examples, the cellular network 104 is using a non-throughput measurement of the UE 102 (i.e. DNS lookup timing) to determine (or predict) a potential past occurrence of an issue with throughput.

In some examples, the throughput estimation module 114 may use additional data to further refine the impaired DNS lookup data. The refinement of the impaired DNS lookup data may help reject normal conditions that may affect DNS lookup timing. As noted above, there may be various factors that may affect DNS timing, some of which may not be related to throughput. Thus, if the cellular network 104 receives a notification of a potential throughput issue, an impaired DNS count may not always be indicative of a throughput issue. Thus, in some examples, other data, some termed Key Performance Indicators (KPI), may also be used in conjunction with impaired DNS counts. The additional data may be stored in the key performance indicator data store 116 (sometimes referred to herein as 'KPI data store 116'). In use, when there is a notification that a potential throughput issue occurred at some point in the past, in addition to the information stored in the DNS lookup timing data store 112, the throughput estimation module 114, which predicts what the throughput would have been during that point in the past, may also access the key performance indicator data store 116.

Some additional data (attributes) includes, but is not limited to, signal strength, number of application downloads or updates per hour, average or maximum throughput of an application downloaded or updated per hour, a number of application samples with an average throughput of less than a period of time, a percentage of application samples with an average throughput of less than a period of time, an application download speed or rate, a total number of DNS lookups per hour, a ratio of impaired DNS lookups to the total number of DNS lookups per hour, a total number of secondary DNS lookups per hour, the amount of data consumed per hour, a total number of Reference Signals Received Power (RSRP) samples per hour, a total number of RSRP samples with values of less than a quality level per hour, and an average RSRP per time frame. It should be noted that the presently disclosed subject matter is not limited to any particular type or number of secondary data. It should be noted that the presently disclosed subject matter is not limited to any particular type of data used as additional data.

Figure 2:
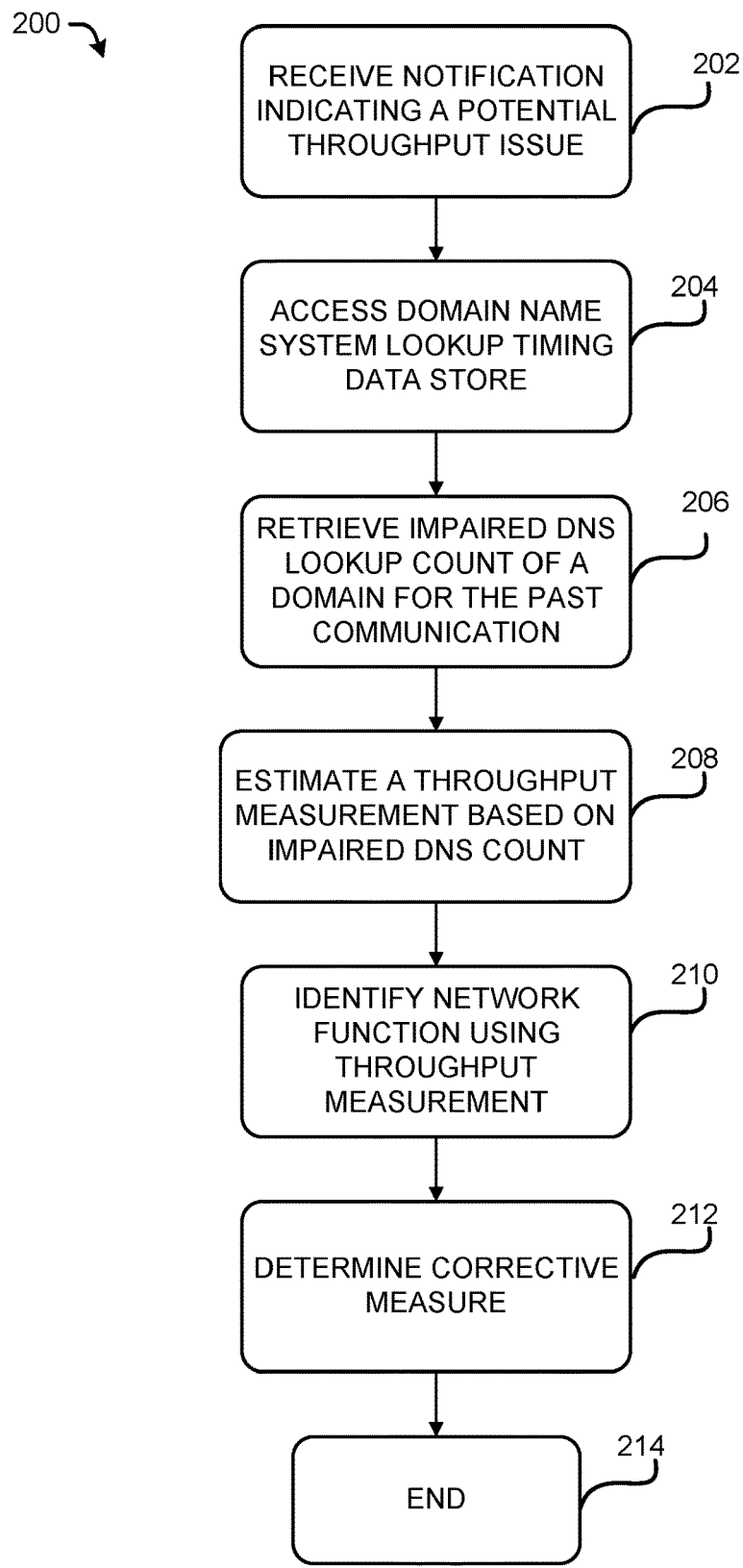
FIG. 2 is an example process for troubleshooting throughput in a cellular network, in accordance with some examples of the present disclosure.

FIG. 2 is an example process 200 for troubleshooting throughput in a cellular network, in accordance with some examples of the present disclosure. The process 200 and other processes described herein are illustrated as example flow graphs, each operation of which may represent a sequence of operations that can be implemented in hardware, software, or a combination thereof. In the context of software, the operations represent computer-executable instructions stored on one or more tangible computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

The process 200 commences at operation 202, where a notification indicating a potential throughput issue is received. In some examples, the notification is received from the UE 102. In other examples, the notification received may be generated by a function of the cellular network 104. The presently disclosed subject matter is not limited to any particular origination of the notification.

The process 200 continues to operation 204, where the throughput estimation module 114 accesses the DNS lookup timing data store 112. The DNS lookup timing data store 112 has stored therein various data relating to DNS lookup times generated by one or more UEs, including the UE 102, when submitting a DNS lookup request through the cellular network 104 to the DNS lookup table 110. The various data can include, but is not limited to, a count of impaired DNS lookups, a time to return an IP address from the DNS lookup table, the amount of time to return the IP address from the receipt of the DNS lookup request, and the like. In the example illustrated in FIG. 2, the data is a count for an impaired DNS count for a domain for the past communication.

The process 200 continues to operation 206, where the count of the impaired DNS lookups is provided to the throughput estimation module 114.

The process 200 continues to operation 208, where the throughput estimation module 114 estimates a throughput measurement. As used herein, a throughput measurement may be a calculated value, or a relative value, based on the particular data available. For example, the throughput estimation module 114 may determine that a particular count of impaired DNS lookups equates to a particular amount of time, especially if attempts or retries of DNS lookups are set by the cellular network 104. In this example, the throughput estimation module 114 may determine that a count of three (3) impaired DNS lookups may equate to approximately 10 seconds. Thus, the throughput estimation module 114 may determine that throughput was delayed by at least 10 bits/second.

In another example, the throughput estimation module 114 may determine that a particular count of impaired DNS lookups is higher than counts of other DNS lookups at the time of the potential issue. For example, there may have been an issue with DNS lookups at the time of the potential issue, but the throughput estimation module 114 may determine that impaired counts for a particular DNS lookup is greater than impaired counts of other DNS lookups for other UEs. Thus, while a particular value may not be determined, the cellular network 104 may determine a relative value.

The process 200 continues to operation 210, where the cellular network 104 identifies a network function using the measurement determined at operation 208.

The process 200 continues to operation 212, where a corrective measure is determined based on the troubleshooting operation performed at operation 210. The process 200 thereafter ends at operation 214.

Figure 3:
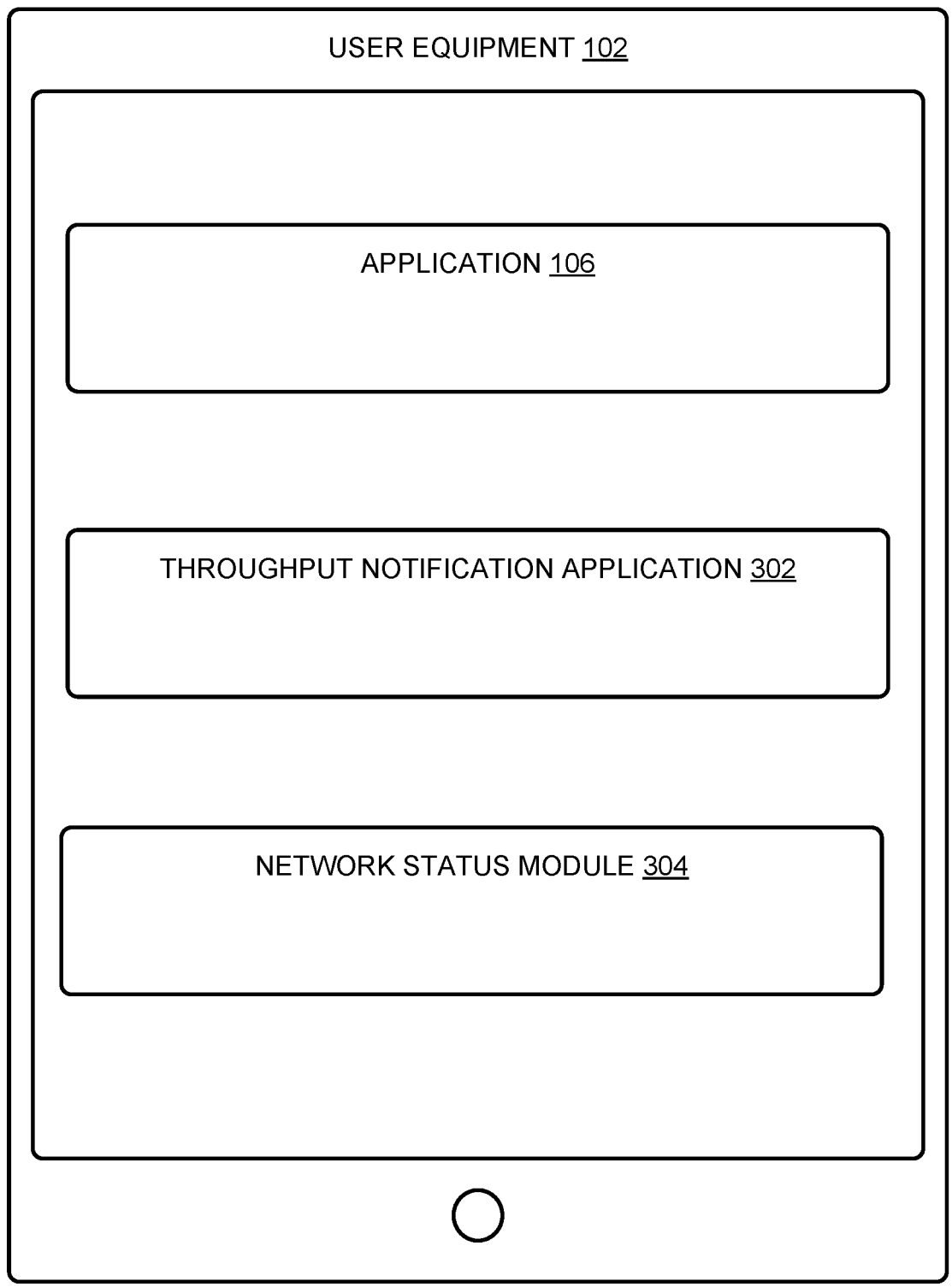
FIG. 3 is an example user interface that may be used to notify a cellular network of a potential throughput issue, in accordance with some examples of the present disclosure.

FIG. 3 is an illustration of a user interface 300 that may be used to notify the cellular network 104 of a potential throughput issue, in accordance with some examples of the presently disclosed subject matter. The UE 102 can be used by a user (not illustrated) to, among other functions, access services provided on the Internet. For example, the application 106 may be an Internet browser used to access various websites for informational and entertainment purposes. The application 106 utilizes the connection between the UE 102 and the network 104 to access the services of a service provider 108. The service provider 108 may be one of a number of websites or services provided on the Internet.

In order to utilize the services of the service provider 108, the application 106 transmits to the cellular network 104 a domain name of the service provider 108. The cellular network 104 receives the domain name and accesses a DNS lookup table 110. The DNS lookup table 110 contains the Internet Protocol (IP) addresses of the domain name requested by the application 106. The cellular network 104 retrieves the IP address and transmits the IP address to the application 106 so that the application 106 can locate and use the services of the service provider 108 on the Internet.

In some examples, the user (or a function of the UE 102) may be using the application 106 and notice a slowing down (or even stoppage) of the services provided by the application 106. For example, the application 106 may be an Internet browser that takes an unexpectedly long time to access and show the Internet sites the user is attempting to access. A throughput notification application 302 to allow a user of the UE 102, upon the detection or perception of a slowing down of the services through the application 106 (indicating a potential throughput issue), to generate a notification. The throughput notification application 302 is configured to receive an input and transmit a notification indicating a potential throughput issue of the UE 102 for a past communication over the cellular network 104. The cellular network 104 may receive the notification from the throughput notification application 302 and commence a troubleshooting operation, such as the process 200 described above. In some examples, the notification received by the cellular network 104 may be used to place a timestamp or other indication as to which communication the throughput issue may have occurred. In some examples, the throughput notification application 302 may be integrated into the application 106 as a service or input into the application 106 itself. In another example, network attributes are collected and then, at a later time, throughputs are predicted for devices. Results might appear in a heat map to indicate throughput. This could then be used to identify geographic areas needing additional capacity or to confirm the impact of capacity upgrades. These and other use examples not disclosed are considered to be within the scope of the presently disclosed subject matter.

In some examples, to help reduce a number of potentially false notifications from the throughput notification application 302 or to provide additional information to the cellular network 104, a network status module 304 may be provided. In some examples, a throughput issue may not be related to any particular component or function of the cellular network 104, but rather, may be based on the connection, or lack thereof, between the UE 102 and the cellular network 104 itself. A user may not notice that the UE 102 may not be connected to the cellular network 104, or that the connection between the cellular network 104 and the UE 102 may be of such low quality or using a frequency reserved for slower connections (such as a 3G connection in which the connection is normally a 4G LTE connection). Thus, in some examples, when the throughput notification application 302 receives an input to provide a notification to the cellular network 104, the network status module 304 may be accessed to determine, among other things, if there is a network connection and/or the quality of the network connection. In some examples, the notification is transmitted with the information provided by the network status module 304.

Figure 4:
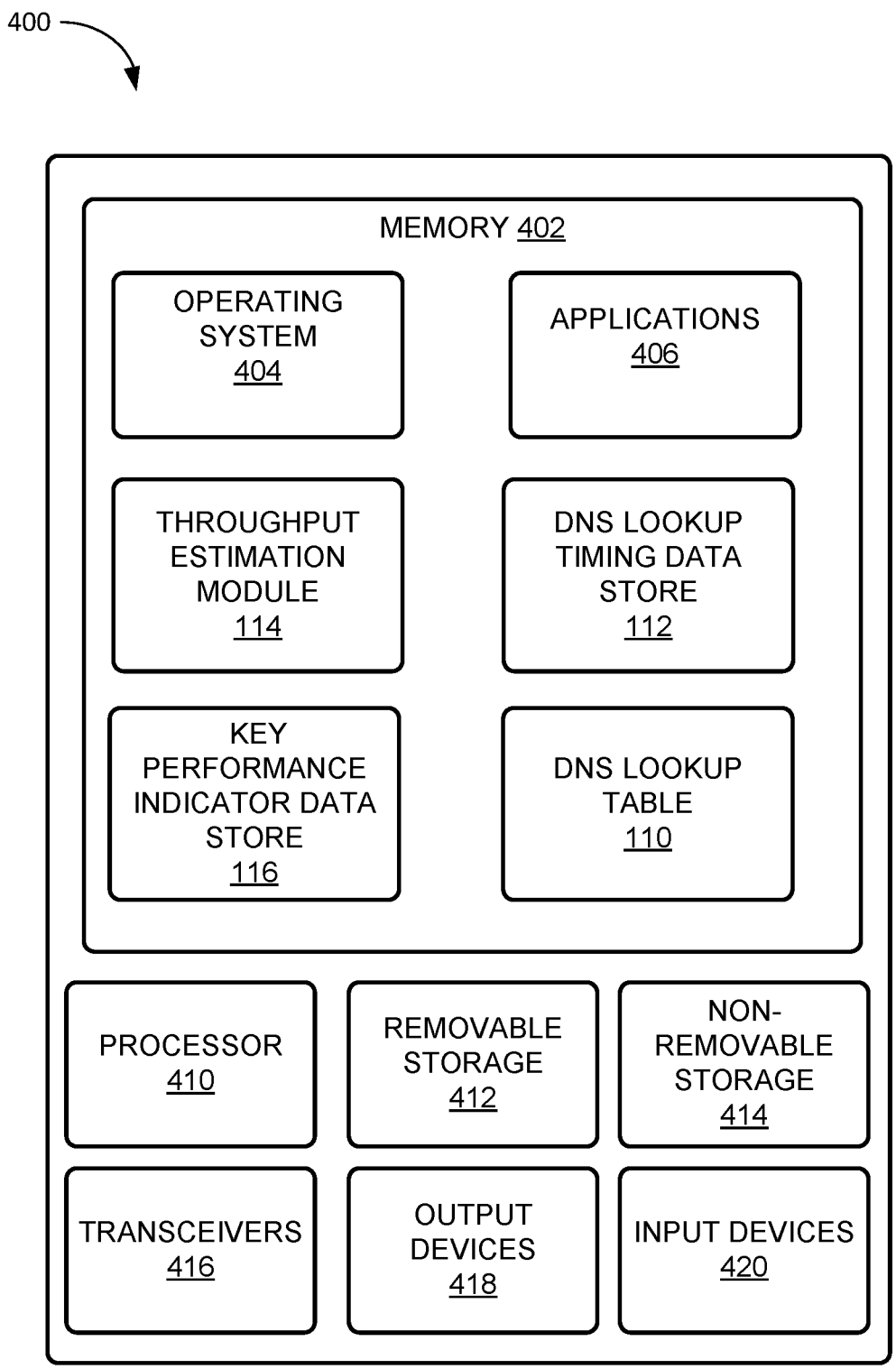
FIG. 4 depicts a component level view of a server computer for use with the systems and methods described herein, in accordance with some examples of the present disclosure.

FIG. 4 depicts a component level view of a server computer 400 for use with the systems and methods described herein. The server computer 400 could be any device or combination of devices capable of providing the functionality associated with the systems and methods described herein. The server computer 400 can comprise several components, modules, software functions, or computing devices to execute the above-mentioned functions. The server computer 400 may be comprised of hardware, software, or various combinations thereof.

As discussed below, the server computer 400 can comprise memory 402 including an operating system (OS) 404 and one or more standard applications 406. The standard applications 406 may include applications that provide for communication with the cellular network 104 and the UE 102. The OS 404 varies depending on the manufacturer of the server computer 400. The OS 404 contains the modules and software that support basic functions of the server computer 400, such as scheduling tasks, executing applications, and controlling peripherals. In some examples, the OS 404 can enable the throughput estimation module 114, and provide other functions, as described above, via transceiver(s) 416. The OS 404 can also enable the server computer 400 to send and retrieve other data and perform other functions.

The server computer 400 memory 402 can also comprise instructions that, when executed by the server computer 400, or another entity, execute the throughput estimation module 114. The memory 402 may also include the DNS lookup timing data store 112, the DNS lookup table 110, and the KPI data store 116. It should be noted that, in some examples, the DNS lookup timing data store 112, the DNS lookup table 110, and/or the KPI data store 116, or portions thereof, may be stored in a database controlled by another entity of the cellular network 104 or another system. For example, the DNS lookup table 110 may be controlled or operated by a central system to maintain consistency of DNS tables across various networks.

The server computer 400 can also comprise one or more processors 410 and one or more of removable storage 412, non-removable storage 414, transceiver(s) 416, output device(s) 418, and input device(s) 420. In various implementations, the memory 402 can be volatile (such as random access memory (RAM)), non-volatile (such as read only memory (ROM), flash memory, etc.), or some combination of the two.

In some implementations, the processor(s) 410 can be one or more central processing units (CPUs), graphics processing units (GPUs), both CPU and GPU, or any other combinations and numbers of processing units. The server computer 400 may also include additional data storage devices (removable and/or non-removable) such as, for example, magnetic disks, optical disks, or tape. Such additional storage is illustrated in FIG. 4 by removable storage 412 and non-removable storage 414.

Non-transitory computer-readable media may include volatile and nonvolatile, removable and non-removable tangible, physical media implemented in technology for storage of information, such as computer readable instructions, data structures, program modules, or other data. The memory 402, removable storage 412, and non-removable storage 414 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information and which can be accessed by the server computer 400. Any such non-transitory computer-readable media may be part of the server computer 400 or may be a separate database, databank, remote server, or cloud-based server.

In some implementations, the transceiver(s) 416 include any transceivers known in the art. In some examples, the transceiver(s) 416 can include wireless modem(s) to facilitate wireless connectivity with other components (e.g., between the server computer 400 and a wireless modem that is a gateway to the Internet), the Internet, and/or an intranet. Specifically, the transceiver(s) 416 can include one or more transceivers that can enable the server computer 400 to send and receive data using the cellular network 104. Thus, the transceiver(s) 416 can include multiple single-channel transceivers or a multi-frequency, multi-channel transceiver to enable the server computer 400 to send and receive video calls, audio calls, messaging, etc. The transceiver(s) 416 can enable the server computer 400 to connect to multiple networks including, but not limited to 2G, 3G, 4G, 5G, and Wi-Fi networks. The transceiver(s) can also include one or more transceivers to enable the server computer 400 to connect to future (e.g., 6G) networks, Internet-of-Things (IoT), machine-to machine (M2M), and other current and future networks.

The transceiver(s) 416 may also include one or more radio transceivers that perform the function of transmitting and receiving radio frequency communications via an antenna (e.g., Wi-Fi or Bluetooth®). In other examples, the transceiver(s) 416 may include wired communication components, such as a wired modem or Ethernet port, for communicating via one or more wired networks. The transceiver(s) 416 can enable the server computer 400 to facilitate audio and video calls, download files, access web applications, and provide other communications associated with the systems and methods, described above.

In some implementations, the output device(s) 418 include any output devices known in the art, such as a display (e.g., a liquid crystal or thin-film transistor (TFT) display), a touchscreen, speakers, a vibrating mechanism, or a tactile feedback mechanism. Thus, the output device(s) can include a screen or display. The output device(s) 418 can also include speakers, or similar devices, to play sounds or ringtones when an audio call or video call is received. Output device(s) 418 can also include ports for one or more peripheral devices, such as headphones, peripheral speakers, or a peripheral display.

In various implementations, input device(s) 420 include any input devices known in the art. For example, the input device(s) 420 may include a camera, a microphone, or a keyboard/keypad. The input device(s) 420 can include a touch-sensitive display or a keyboard to enable users to enter data and make requests and receive responses via web applications (e.g., in a web browser), make audio and video calls, and use the standard applications 406, among other things. A touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. A touch sensitive display can act as both an input device 420 and an output device 418.

The presently disclosed examples are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A non-transitory computer-readable storage medium having computer-executable instructions stored thereupon that, when executed by a computer, cause the computer to perform acts comprising:
   receiving a notification, wherein the notification comprises a potential throughput issue of a first traffic flow of a user device of a traffic flow parameter;
   accessing a plurality of second indicators in response to the notification, wherein the plurality of second indicators are for a plurality of second traffic flows that occur before the notification, wherein the plurality of second indicators comprise an impaired Domain Name System (DNS) count of a domain for the plurality of second traffic flows;
   estimating a throughput measurement of the plurality of second traffic flows based on the impaired DNS count;
   accessing a module to determine a network function causing the impaired DNS count; and
   maintaining a plurality of third traffic flows after the notification using a corrective measure based on identifying the network function causing the impaired DNS count.

2. The non-transitory computer-readable storage medium of claim 1, further comprising computer-executable instructions that, when executed by the computer, cause the computer to perform the act comprising modifying the throughput measurement using a Key Performance Indicator (KPI).

3. The non-transitory computer-readable storage medium of claim 1, wherein the KPI comprises a ratio of impaired DNS access attempts to a total number of DNS access attempts by the user device.

4. The non-transitory computer-readable storage medium of claim 1, wherein the KPI comprises a total of secondary DNS access attempts per time frame by the user device of impaired DNS access attempts to a total number of DNS access attempts by the user device.

5. The non-transitory computer-readable storage medium of claim 1, further comprising computer-executable instructions that, when executed by the computer, cause the computer to modify the throughput measurement using one or more of a signal strength, a number of application downloads or updates per hour, an average or maximum throughput of an application downloaded or updated per hour, a number of application samples with an average throughput of less than a period of time, a percentage of application samples with an average throughput of less than a period of time, an application download speed or rate, a total number of DNS lookups per hour, a ratio of impaired DNS lookups to the total number of DNS lookups per hour, a total number of secondary DNS lookups per hour, an amount of data consumed per hour, a total number of Reference Signals Received Power (RSRP) samples per hour, a total number of RSRP samples with values of less than a quality level per hour, and an average RSRP per time frame.

6. The non-transitory computer-readable storage medium of claim 1, further comprising computer-executable instructions that, when executed by the computer, cause the computer to:
   access information relating to the domain and the network at the time of the first traffic flow; and
   initiate a troubleshooting operation to determine an issue with the domain or the network at the time of the first traffic flow.

7. The non-transitory computer-readable storage medium of claim 1, further comprising computer-executable instructions that, when executed by the computer, cause the computer to:
   identify a second user device having a similar impaired DNS count of the domain at the time of the first traffic flow;
   retrieve network information relating to the user device and the second user device; and
   attempt to identify a network issue or a domain issue.

8. The non-transitory computer-readable storage medium of claim 1, further comprising computer-executable instructions that, when executed by the computer, cause the computer to initiate a monitoring protocol to monitor the domain for a period of time to determine if an additional impaired DNS count occurs.

9. A system comprising:
   a memory storing computer-executable instructions; and
   processor in communication with the memory, the computer-executable instructions causing the processor to perform acts comprising:
   receiving a notification, wherein the notification comprises a potential throughput issue of a first traffic flow of a user device of a traffic flow parameter;
   accessing a plurality of second indicators in response to the notification, wherein the plurality of second indicators are for a plurality of second traffic flows that occur before the notification, wherein the plurality of second indicators comprise an impaired Domain Name System (DNS) count of a domain for the plurality of second traffic flows;
   estimating a throughput measurement of the plurality of second traffic flows based on the impaired DNS count;
   accessing a module to determine a network function causing the impaired DNS count; and
   maintaining a plurality of third traffic flows after the notification using a corrective measure based on identifying the network function causing the impaired DNS count.

10. The system of claim 1, further comprising computer-executable instructions for modifying the throughput measurement using a Key Performance Indicator (KPI).

11. The system of claim 1, wherein the KPI comprises a ratio of impaired DNS access attempts to a total number of DNS access attempts by the user device.

12. The system of claim 1, wherein the KPI comprises a total of secondary DNS access attempts per time frame by the user device of impaired DNS access attempts to a total number of DNS access attempts by the user device.

* * * * *